(12) United States Patent
Pillonnet et al.

(10) Patent No.: US 9,774,250 B2
(45) Date of Patent: Sep. 26, 2017

(54) COLD START DC/DC CONVERTER

(71) Applicant: Commissariat à l'Energie Atomique et aux Energies Alternatives, Paris (FR)

(72) Inventors: Gaël Pillonnet, Sassenage (FR); Thomas Martinez, Grenoble (FR)

(73) Assignee: COMMISARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 14 days.

(21) Appl. No.: 14/960,755

(22) Filed: Dec. 7, 2015

(65) Prior Publication Data

US 2016/0164404 A1  Jun. 9, 2016

(30) Foreign Application Priority Data

Dec. 8, 2014 (FR) .................................... 14 62060

(51) Int. Cl.
| | |
|---|---|
| G05F 1/10 | (2006.01) |
| G05F 3/02 | (2006.01) |
| H02M 3/07 | (2006.01) |
| H02M 1/36 | (2007.01) |

(52) U.S. Cl.
CPC ............. *H02M 3/07* (2013.01); *H02M 1/36* (2013.01); *H02M 3/073* (2013.01)

(58) Field of Classification Search
CPC .. H02M 3/073; H02M 3/07; H02M 2003/077; G11C 5/145; G05F 3/205
USPC ...................................... 327/536; 363/59–60
See application file for complete search history.

(56) References Cited

U.S. PATENT DOCUMENTS

| | | | | |
|---|---|---|---|---|
| 4,106,086 | A * | 8/1978 | Holbrook | H02M 3/07 363/60 |
| 5,510,814 | A * | 4/1996 | Ise | G09G 3/3696 345/211 |
| 5,694,308 | A | 12/1997 | Cave | |
| 5,886,887 | A | 3/1999 | Jenq | |
| 5,982,223 | A | 11/1999 | Park et al. | |
| 6,163,494 | A | 12/2000 | Nork | |
| 6,226,194 | B1 * | 5/2001 | Bayer | H02M 3/07 307/110 |
| 8,503,203 | B1 * | 8/2013 | Szczeszynski | H02M 3/073 307/110 |
| 8,604,869 | B1 | 12/2013 | Ma | |
| 2002/0154524 | A1 | 10/2002 | Yamanaka et al. | |

(Continued)

FOREIGN PATENT DOCUMENTS

FR        2884072 A1    10/2006

OTHER PUBLICATIONS

Joita et al., "An Active Switch Improved Dickson Charge Pump Implemented in a BCD Process", Rohm Semiconductor European Design Centre, Willich, Germany, Conference: Semiconductor Conference (CAS), 2012 International, vol. 2.

(Continued)

*Primary Examiner* — Quan Tra
(74) *Attorney, Agent, or Firm* — The Noblitt Group, PLLC

(57) ABSTRACT

A DC/DC converter comprising a first charge pump circuit including first MOS transistors including first depletion MOS transistors, an oscillating circuit connected to the charge pump circuit only at the gates of some at least of the first MOS transistors, including the first depletion MOS transistors.

12 Claims, 5 Drawing Sheets

(56) References Cited

U.S. PATENT DOCUMENTS

| | | | |
|---|---|---|---|
| 2003/0151448 A1* | 8/2003 | Fujiyama | H02M 3/07 327/536 |
| 2008/0013349 A1 | 1/2008 | Yanagida et al. | |
| 2008/0079480 A1* | 4/2008 | Utsunomiya | H02M 3/073 327/536 |
| 2008/0218250 A1* | 9/2008 | Kimura | H02M 3/07 327/536 |
| 2009/0160532 A1* | 6/2009 | Wu | H02M 3/073 327/536 |
| 2010/0309716 A1* | 12/2010 | Tsukada | G11C 5/145 365/163 |
| 2011/0050328 A1 | 3/2011 | Floyd | |
| 2011/0133819 A1 | 6/2011 | Cook et al. | |

OTHER PUBLICATIONS

Oh et al. "Charge pump circuit for depletion-mode oxide TFTs", Electronics Letters Mar. 17, 2011 vol. 47 No. 6.

Ramadass et al., "A. Batteryless Thermoelectric Energy-Harvesting Interface Circuit with 35mV Startup Voltage," 2010 IEEE International Solid-State Circuits Conference, pp. 486-488.

Chen et al., "Startup Techniques for 95 mV Step-Up Converter by Capacitor Pass-On Scheme and Vth-Tuned Oscillator With Fixed Charge Programming," IEEE Journal of Solid-State Circuits, vol. 47, No. 5, May 2012, pp. 1252-1260.

\* cited by examiner

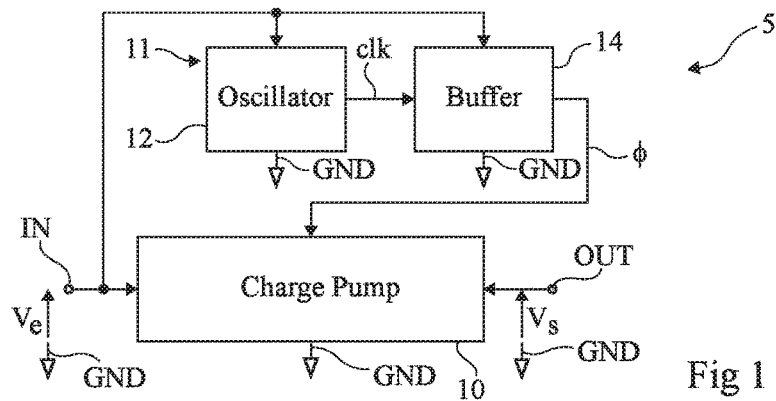
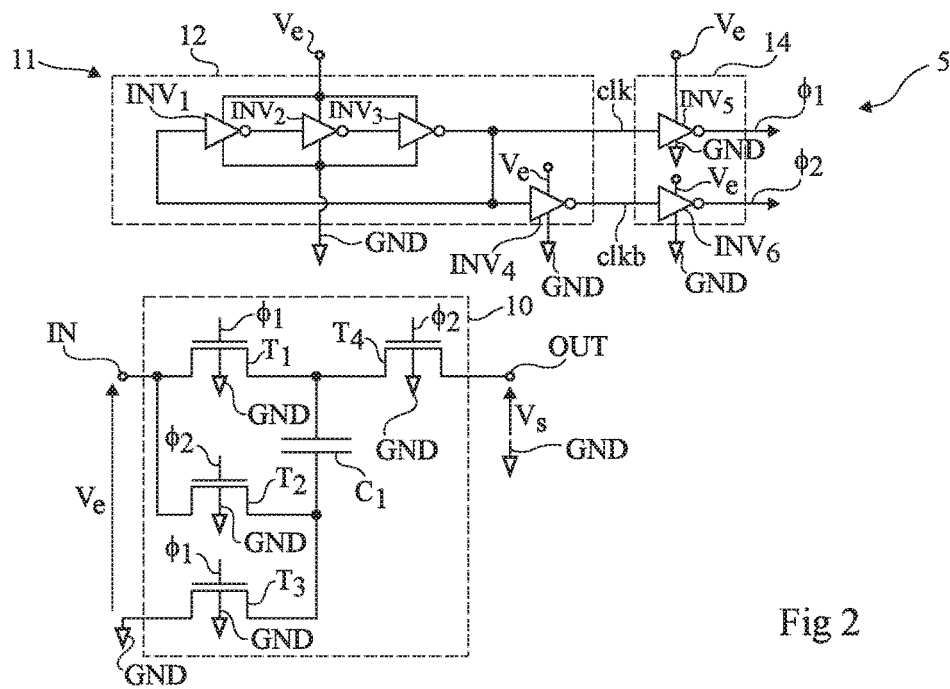
Fig 1
Fig 2
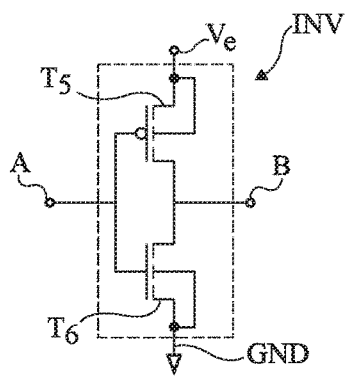
Fig 3
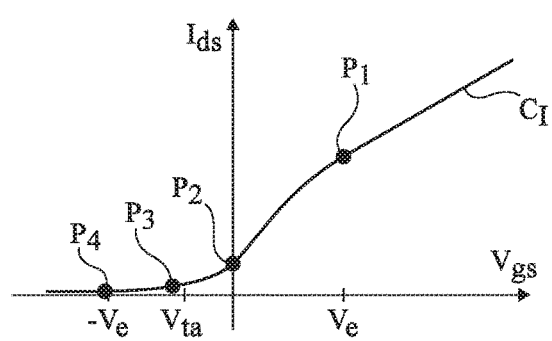
Fig 4

COLD START DC/DC CONVERTER

This application claims the priority benefit of French Patent application number 14/62060, filed on Dec. 8, 2014, the contents of which is hereby incorporated by reference in its entirety to the maximum extent allowable by law.

BACKGROUND The present disclosure relates to a DC/DC voltage converter.

DISCUSSION OF THE RELATED ART

A DC/DC voltage converter may be used in an electronic power recovery system. Such a system generally comprises a transducer capable of converting non-electric power, for example, thermal power, mechanical power, radioactive power, etc., into electric power, generally delivered under a low voltage, and a DC/DC converter capable of converting this low voltage into a higher voltage, for example, for power storage or electronic circuit power supply purposes.

It is generally desirable for the electronic power recovery system to be able to operate, and in particular to start, with no addition of external power other than the electric power collected by the transducer. Such a starting is called a cold start. In particular, it may be desirable for the DC/DC converter to be able to have a cold start even when the voltage supplied by the transducer is low, for example, lower than the threshold voltage of the semiconductor junctions, which is approximately 300 mV.

There exist cold start DC/DC voltage converters using electronic components, such as electric transformers or tunnel-effect diodes, which cannot be simply formed by conventional methods of manufacturing field-effect transistors of metal-oxide-semiconductor type, also called MOS transistors.

It would however be desirable to be able to form the DC/DC converter with conventional MOS transistor technologies, particularly to decrease the manufacturing cost thereof.

SUMMARY

An object of an embodiment is to overcome all or part of the disadvantages of previously-described cold start DC/DC voltage converters.

Another object of an embodiment is that the DC/DC converter can have a cold start while only being powered with a low voltage, particularly lower than 300 mV.

Another object of an embodiment is for the DC/DC converter to only comprise electronic components capable of being formed with conventional MOS transistor manufacturing technologies.

Thus, an embodiment provides a DC/DC converter comprising a first charge pump circuit comprising first MOS transistors having first depletion MOS transistors, an oscillating circuit connected to the charge pump circuit only at the gates of some at least of the first MOS transistors, including the first depletion MOS transistors.

According to an embodiment, the oscillating circuit comprises a ring oscillator.

According to an embodiment, the first charge pump circuit comprises a first terminal intended to receive a first voltage, at least one capacitor, and at least one conduction path between the first terminal and an electrode of the capacitor only comprising one of the first depletion MOS transistors or some of said first depletion MOS transistors in series.

According to an embodiment, the oscillating circuit is powered with the first voltage.

According to an embodiment, the first charge pump circuit is intended to supply a second voltage and the oscilla-ting circuit is powered with the second voltage.

According to an embodiment, the first charge pump circuit further comprises a second terminal intended to supply the second voltage and the first charge pump circuit comprises at least one conduction path between the first terminal and the second terminal only comprising some of said first depletion MOS transistors in series.

According to an embodiment, the converter comprises a second charge pump circuit comprising second MOS transistors, including second depletion MOS transistors, the oscillating circuit being connected to the second charge pump circuit only at the gates of at least some of the second MOS transistors including the second depletion MOS transistors, the second charge pump circuit comprising a third terminal intended to receive the first voltage and a fourth terminal intended to supply a third voltage of a sign opposite to that of the first voltage, and the oscillating circuit is powered between the second voltage and the third voltage.

According to an embodiment, the converter comprises a third charge pump circuit only comprising third enhancement MOS transistors, the oscillating circuit being further connected to the third charge pump circuit only at the gates of some at least of the third enhancement MOS transistors, the third charge pump circuit comprising a fifth terminal intended to receive the first voltage and a sixth terminal intended to supply a fourth voltage of same sign as the first voltage.

According to an embodiment, the converter further comprises a switching circuit capable of successively powering the oscillating circuit with the second voltage and with the fourth voltage.

An embodiment also provides an electronic power recovery system comprising a transducer capable of supplying a voltage from a power source and a converter such as previously defined, the charge pump circuit receiving said voltage.

The foregoing and other features and advantages will be discussed in detail in the following non-limiting description of specific embodiments in connection with the accompanying drawings.

BRIEF DESCRIPTION OF THE DRAWINGS

FIG. 1 shows in the form of a block diagram an embodiment of cold start DC/DC converter;

FIG. 2 is a more detailed electric diagram of an embodiment of the converter of FIG. 1;

FIG. 3 is an electric diagram of a detail of an element of the converter of FIG. 2;

FIG. 4 shows a curve of the variation of the drain current of a depletion MOS transistor according to the gate-source voltage;

DETAILED DESCRIPTION

Figure 5:
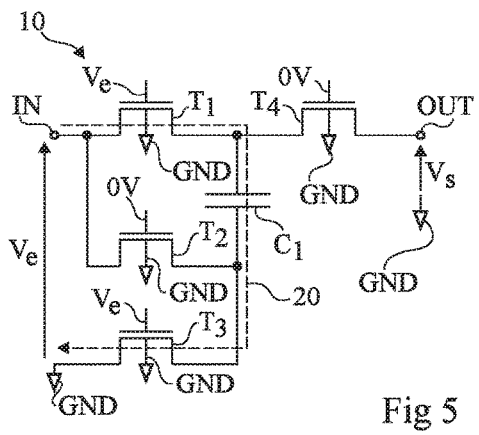
FIGS. 5 and 6 are electric diagrams of a portion of the converter of FIG. 2 at two successive steps of operation of the converter.

The same elements have been designated with the same reference numerals in the different drawings. For clarity, only those elements which are useful to the understanding of the described embodiments have been shown and are detailed. In particular, the structure of a transducer is well known by those skilled in the art and has not been described in detail. Unless otherwise specified, expressions "approximately", "substan-tially", and "in the order of" mean to within 10%, preferably to within 5%. Further, a signal which alternates between a first constant state, for example, a low state, noted "0", and a second constant state, for example, a high state, noted "1", is called "binary signal". The high and low states of binary signals of a same electronic circuit may be different. In particular, the binary signals may correspond to voltages or to currents which may not be perfectly constant in the high or low state. In the following description, the source and the drain of a MOS transistor are called "power terminals" of the MOS transistor. Further, in the present description, term "connected" is used to designate a direct electric connection, with no intermediate electronic component, for example, by means of a conductive track, and term "coupled" or term "linked" will be used to designate either a direct electric connection (then meaning "connected") or a connection via one or a plurality of intermediate components (resistor, capacitor, etc.).

FIG. 1 shows in the form of a block diagram an embodiment of a converter 5 comprising:

a charge pump circuit 10 (Charge Pump) receiving a voltage $V_e$ at an input node IN and supplying a voltage $V_s$ to an output node OUT; and an oscillating circuit 11 supplying at least one digital control signal $\phi$ to charge pump circuit 10.

Oscillating circuit 11 may comprise:

an oscillator 12 (Oscillator) supplying at least one clock signal clk; and an interface circuit 14 (Buffer) receiving clock signal clk and supplying digital control signal $\phi$.

In the present embodiment, oscillator 12 and interface circuit 14 are powered with input voltage $V_e$ and are further connected to a source of a reference potential GND, for example, the ground, which is taken to be equal to 0 V in the following description.

Voltage $V_e$ is a DC voltage, capable of yawing over time, supplied by an electronic circuit, not shown. It may be the voltage supplied by a transducer capable of transforming into electric power another form of power, for example, thermal power, mechanical power, or radiative power. Voltage $V_e$ may be lower than 300 mV, for example, in the range from 100 mV to 200 mV. In the following description, voltages $V_e$ and $V_s$ are reference to ground GND.

Voltage $V_s$ supplied by charge pump circuit 10 is equal to the product of voltage $V_e$ and of a transformation ratio k, positive or negative, which depends on the structure of charge pump circuit 10. Terminal OUT may be connected to a dissipative load, for example, for the powering of an electronic device, and/or to a capacitive load, for example, for power storage.

Clock signal clk and control signal $\phi$ are binary signals. Control signal $\phi$ alternates between voltage $V_e$ and 0 V.

Interface circuit 14 is capable of shaping clock signal clk to supply control signal $\phi$ in a form adapted to charge pump circuit 10. As a variation, it is possible for interface circuit 14 not to be present, and clock signal clk may then directly be used as a control signal.

According to an embodiment, charge pump circuit 10 comprises depletion MOS transistors having their gates controlled by control signal $\phi$. A depletion transistor is a transistor for which a conductive channel is present between the source and the drain even when the gate is at 0 V. The threshold voltage of an N-channel depletion MOS transistor is negative.

Charge pump circuit 10 comprises at least one capacitor. The conduction path or the conduction paths between input node IN and one of the capacitor electrodes is only formed by the channels of depletion MOS transistors having their gates controlled by the oscillating circuit. Control signals $\phi$ supplied by interface circuit 14 are only supplied to MOS transistor gates. This enables to decrease the current to be supplied by interface circuit 14 and advantageously enables to ensure that the charge pump circuit operates during a cold start even if voltage $V_e$ is low.

Preferably, at least one conduction path between input node IN and output node OUT is only formed by the channels of depletion MOS transistors having their gates controlled by the oscillating circuit. This advantageously enables, in a cold start, converter 10 to provide a voltage $V_s$ different from 0 V as soon as voltage $V_e$ is different from 0 V.

According to an embodiment, charge pump circuit 10 only comprises MOS transistors and at least one capacitor. According to an embodiment, all the MOS transistors of charge pump circuit 10 are depletion MOS transistors. According to another embodiment, charge pump circuit 10 comprises at least one depletion MOS transistor and enhancement MOS transistors.

FIG. 2 shows a more detailed embodiment of converter 5 of FIG. 1 where oscillator 12 is a ring oscillator, where charge pump circuit 10 is a voltage doubler and where interface circuit 14 comprises inverters.

In this embodiment, charge pump circuit 10 comprises four N-channel depletion MOS transistors $T_1$, $T_2$, $T_3$, and $T_4$ and one capacitor $C_1$. A first power terminal of transistor $T_1$ is connected to input node IN and the second power terminal of transistor $T_1$ is connected to a first electrode of capacitor $C_1$. The gate of transistor $T_1$ receives a first control signal $\phi_1$. A first power terminal of transistor $T_2$ is connected to input node IN and the second power terminal of transistor $T_2$ is connected to the second electrode of capacitor $C_1$. The gate of transistor $T_2$ receives a second control signal $\phi_2$. A first power terminal of transistor $T_3$ is connected to the second electrode of capacitor $C_1$ and the second power terminal of transistor $T_3$ is connected to ground GND. The gate of transistor $T_3$ receives first control signal $\phi_1$. A first power terminal of transistor $T_4$ is connected to the first electrode of capacitor $C_1$ and the second power terminal of transistor $T_4$ is connected to output node OUT. The gate of transistor $T_4$ receives second control signal $\phi_2$. The bulk of each MOS transistor $T_1$ to $T_4$ is connected to ground GND.

Oscillator 12 comprises a succession of an odd number of series-connected inverters, the output of the last inverter of the succession of inverters being connected to the input of the first inverter of the succession of inverters. Three series-connected inverters $INV_1$, $INV_2$, $INV_3$ are shown in FIG. 2, the output of inverter $INV_3$ being connected to the input of inverter $INV_1$. Inverter $INV_3$ supplies clock signal clk. Oscillator 12 further comprises an inverter $INV_4$ having its input connected to the output of inverter $INV_3$, and supplying a clock signal clkb. Each clock signal clk, clkb is a binary signal. Signals clk and clkb are complementary. The period of signal clk particularly depends on power supply voltage $V_e$ of oscillator 12 and on the number of series-connected inverters.

Interface circuit 14 comprises an inverter $INV_5$ receiving signal clk and supplying clock signal $\phi_1$. Interface circuit 14 comprises an inverter $INV_6$ receiving signal clkb and supplying control signal $\phi_2$. Each inverter $INV_1$ to $INV_6$ is connected to anode for supplying voltage $V_e$ and is connected to ground GND.

FIG. 3 shows an embodiment of an inverter INV. Each inverter $INV_1$ to $INV_6$ may have the structure shown in FIG. 3. Inverter INV comprises an input node A and an output node B. Inverter INV comprises a MOS transistor $T_5$, for example, a P-channel enhancement MOS transistor, having its source connected to a node for supplying voltage Ve, having its drain connected to node B, and having its gate connected to node A. The bulk of transistor $T_5$ is connected to a node for supplying voltage Ve. Inverter INV further comprises a MOS transistor $T_6$, for example, an N-channel enhancement MOS transistor, having its source connected to ground GND, having its drain connected to node B, and having its gate connected to node A The bulk of transistor $T_6$ is connected to ground GND.

The operating principle of charge pump circuit 10 according to the embodiment shown in FIG. 2 will now be described in relation with FIGS. 4 to 6.

In nominal operation, interface circuit 14 supplies binary controls signals $\phi_1$ and $\phi_2$ which are complementary. In the present embodiment, each signal $\phi_1$ and $\phi_2$ corresponds to a voltage which substantially alternates between voltage $V_e$ and 0 V. In steady state, charge pump circuit 10 supplies a voltage $V_s$ which is proportional to $V_e$, transformation ratio k being theoretically equal to 2 and, in practice, slightly smaller than 2.

FIG. 4 is a curve $C_I$ of the variation of drain-source current $I_{ds}$ of an N-channel depletion MOS transistor according to gate-source voltage $V_{gs}$ in ohmic state. Four bias points P1 to P4 have been shown on curve $C_I$.

FIG. 5 illustrates the conduction state of each MOS transistor $T_1$ to $T_4$ when control signal $\phi_1$ is at $V_e$ and control signal $\phi_2$ is at 0 V. Transistor $T_1$ is substantially at bias point $P_2$, transistors $T_3$ and $T_4$ are substantially at bias point $P_4$, and transistor $T_3$ is substantially at bias point $P_1$. The current then preferably flows along dashed line 20. Capacitor $C_1$ is then charged under voltage $V_e$.

Figure 6:
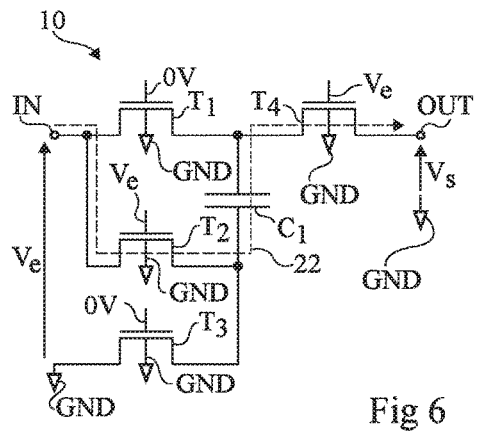

FIG. 6 illustrates the conduction state of each MOS transistor $T_1$ to $T_4$ when control signal $\phi_2$ is at $V_e$ and control signal $\phi_1$ is at 0 V. Transistor $T_2$ is at bias point $P_1$, transistors $T_1$ and $T_3$ are at bias point $P_4$, and transistor $T_4$ is at bias point $P_3$. The current then preferably flows along dashed line 22, which results in a discharge of capacitor $C_1$ towards output node OUT. Voltage $V_s$ at output node OUT is maintained substantially at approximately $k*V_e$, k being close to 2 in steady state in the present embodiment.

Figure 7:
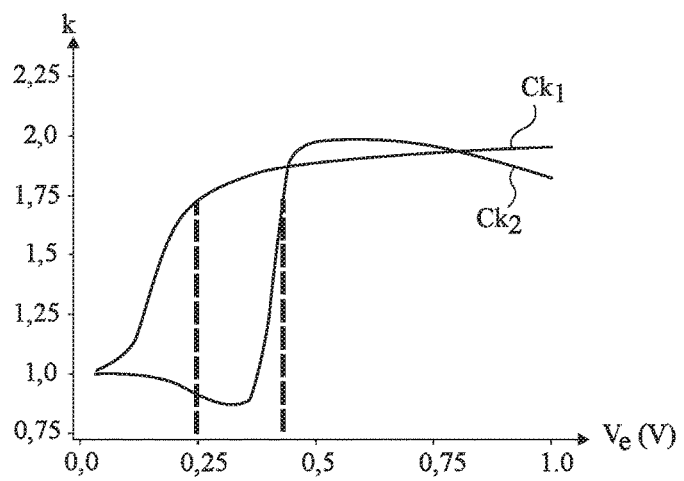
FIG. 7 shows curves of the variation of the transformation ratio of the converter according to the voltage received by the converter respectively for the converter of FIG. 2 and for a converter with enhancement transistors.

FIG. 7 shows variation curves $Ck_1$ and $Ck_2$, according to voltage $V_e$, of transformation ratios $k_1$ and $k_2$ in steady state respectively of converter 5 shown in FIG. 2 and of a converter having the same structure as converter 5 with the difference that transistors $T_1$ to $T_4$ are replaced with N-channel enhancement MOS transistors. Curves $Ck_1$ and $Ck_2$ have been obtained for MOS transistors having a 0.18-µm channel length.

For curves $Ck_1$ and $Ck_2$, transformation ratio $k_1$ and $k_2$ of converter 5 decreases when voltage $V_e$ decreases. However, the decrease is faster when enhancement MOS transistors are used. Indeed, transformation ratio $k_2$ decreases below 1.75 as soon as voltage $V_e$ decreases below 420 mV while transformation ratio $k_1$ decreases below 1.75 only when voltage $V_e$ decreases below 250 mV. The present embodiment thus enables to operate the DC/DC converter at an input voltage smaller than that which can be obtained with a converter having the same structure, formed of enhancement MOS transistors.

Figure 8:
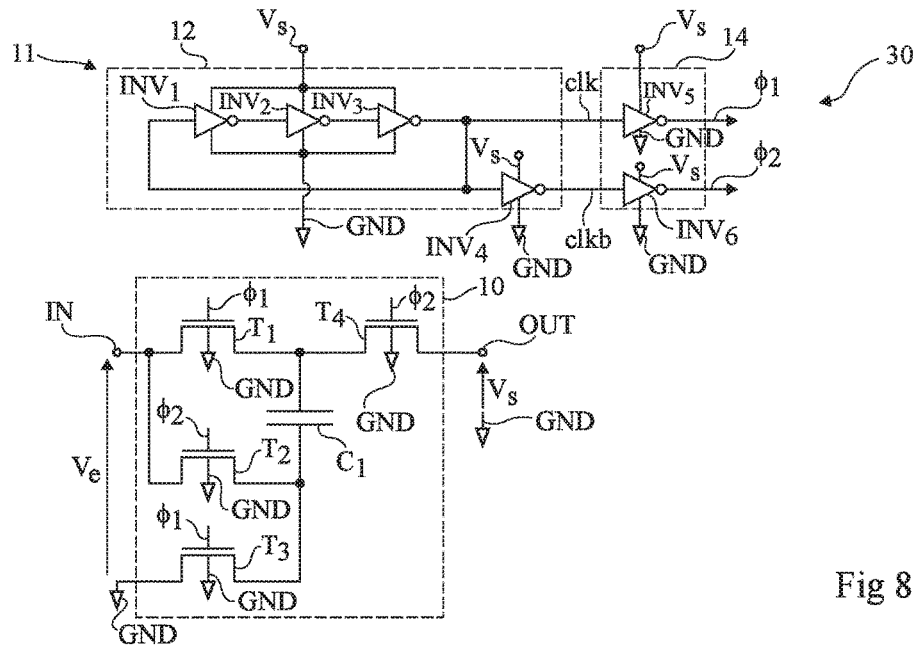
FIGS. 8, 9, and 10 are electric diagrams of other embodiments of a cold start DC/DC converter.

FIG. 8 shows another embodiment of a DC/DC converter 30. Converter 30 comprises all the elements of converter 5 with the difference that inverters $INV_1$ to $INV_6$ are supplied with voltage $V_s$ instead of receiving voltage $V_e$.

In normal operation, voltage $V_s$ is higher than voltage $V_e$. The power supply of oscillating circuit 11 of converter 30 is advantageously more efficient than that of converter 5. Further, the conductivity of MOS transistors $T_1$ to $T_4$ of converter 30 is increased when the gates thereof are taken to $V_s$ in the on state with respect to MOS transistors $T_1$ to $T_4$ of converter 30 having their gates only taken to $V_e$ in the on state.

When voltage $V_e$ increases from the zero value, oscillator 12 of converter 30 cannot start as long as output voltage Vs is smaller than the start voltage of oscillator 12. The current then directly flows through transistors $T_1$ and $T_4$ of charge pump circuit 10 so that voltage $V_s$ rises until it becomes substantially equal to voltage $V_e$. As soon as voltage $V_s$ has reached the start voltage of oscillator 12, the operation of converter 30 carries on as previously described for converter 5 in relation with FIGS. 4 to 6.

Further, as soon as oscillator 12 has started, voltage $V_s$ becomes greater than $V_e$, so that the oscillation frequency of oscillator 12 increases faster than if oscillator 12 was supplied with voltage $V_e$ and the variation rate of the transformation ratio of charge pump circuit 10 is increased.

Generally, charge pump circuit 10 may correspond to any type of voltage step-up, step-down, or inverter charge pump circuit.

Figure 9:
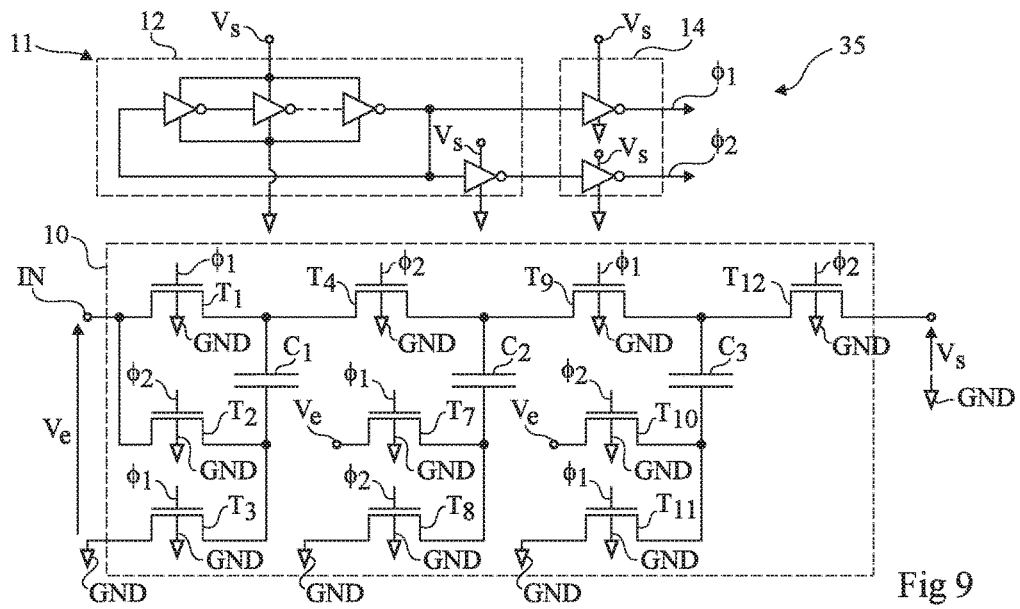

FIG. 9 shows, as an example, another embodiment of a converter 35 where charge pump circuit 10 is a voltage step-up circuit having a transformation ratio of approximately 4. Charge pump circuit 10 of converter 35 comprises transistors $T_1$ to $T_4$ and capacitor $C_1$ previously described in relation with FIG. 2 and further comprises N-channel depletion MOS transistors $T_7$ to $T_{12}$ and capacitors $C_2$ and $C_3$.

The power terminal of transistor $T_4$ which is not connected to capacitor $C_1$ is connected to a first electrode of capacitor $C_2$. A first power terminal of transistor $T_7$ is connected to input node IN and the second power terminal of transistor $T_7$ is connected to the second electrode of capacitor C2. The gate of transistor $T_7$ receives first control signal $\phi_1$. A first power terminal of transistor $T_8$ is connected to ground GND and the second power terminal of transistor $T_8$ is connected to the second electrode of capacitor $C_2$. The gate of transistor $T_8$ receives second control signal $\phi_2$. A first power terminal of transistor $T_9$ is connected to the first electrode of capacitor $C_2$ and the second power terminal of transistor $T_9$ is connected to a first electrode of capacitor $C_3$. The gate of transistor $T_9$ receives first control signal $\phi_1$. A first power terminal of transistor $T_{10}$ is connected to input node IN and the second power terminal of transistor $T_{10}$ is connected to the second electrode of capacitor $C_3$. The gate of transistor $T_{10}$ receives second control signal $\phi_2$. A first power terminal of transistor $T_{11}$ is connected to ground GND and the second power terminal of transistor $T_{11}$ is connected to the second electrode of capacitor $C_3$. The gate of transistor $T_{11}$ receives first control signal $\phi_1$. A first power terminal of transistor $T_{12}$ is connected to the first electrode of capacitor $C_3$ and the second power terminal of transistor $T_{12}$ is connected to output node OUT. The gate of transistor $T_{12}$ receives second control signal $\phi_2$.

Figure 10:
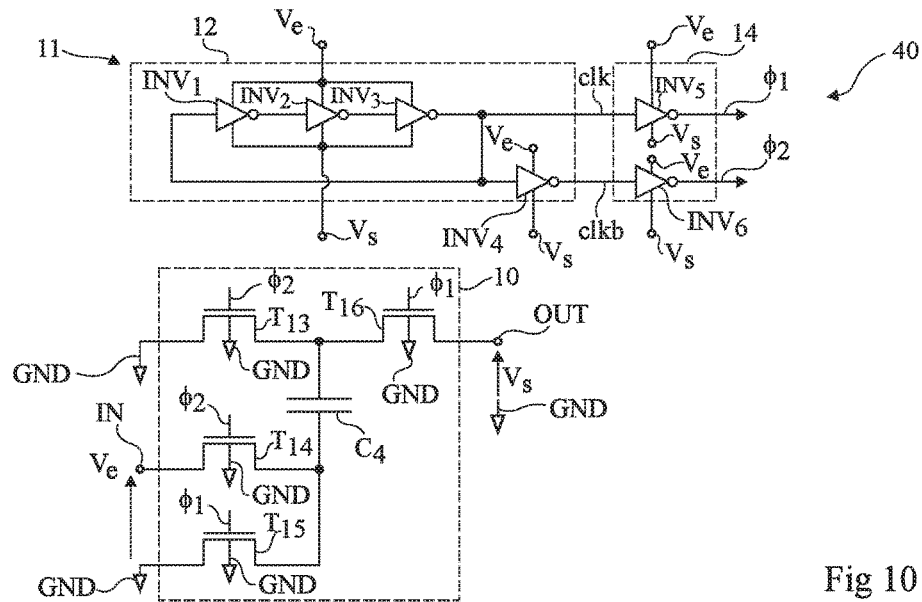

FIG. 10 shows another embodiment of a converter 40. Converter 40 comprises all the elements of converter 35, shown in FIG. 9, with the difference that charge pump circuit 10 is a voltage inverter having a transformation ratio k of approximately −1 and that oscillator 12 and interface circuit 14 are connected to output node OUT supplying voltage $V_s$ instead of being connected to ground GND.

Charge pump circuit 10 of converter 40 comprises four N-channel depletion MOS transistors $T_{13}$, $T_{14}$, $T_{15}$, and $T_{16}$ and one capacitor $C_4$. A first power terminal of transistor $T_{13}$ is connected to ground GND and the second power terminal of transistor $T_{13}$ is connected to a first electrode of capacitor $C_4$. The gate of transistor $T_{13}$ receives second control signal $\phi_2$. A first power terminal of transistor $T_{14}$ is connected to input node IN and the second power terminal of transistor $T_{14}$ is connected to the second electrode of capacitor $C_4$. The gate of transistor $T_{14}$ receives second control signal $\phi_2$. A first power terminal of transistor $T_{15}$ is connected to the second electrode of capacitor $C_4$ and the second power terminal of transistor $T_{15}$ is connected to ground GND. The gate of transistor $T_{15}$ receives first control signal $\phi_1$. A first power terminal of transistor $T_{16}$ is connected to the first electrode of capacitor $C_4$ and the second power terminal of transistor $T_{16}$ is connected to output node OUT. The gate of transistor $T_{16}$ receives first control signal $\phi_1$. The bulk of each transistor $T_{13}$, $T_{14}$, $T_{15}$, and $T_{16}$ is connected to ground GND.

The fact for oscillator 12 and for interface circuit 14 to be biased between voltage $-V_e$ and voltage $V_e$ advantageously enables to improve the operation of converter 40. Indeed, in operation, transistors $T_{13}$, $T_{14}$, $T_{15}$ and $T_{16}$ are more blocked when their gates receive voltage $-V_e$ rather than at ground GND. Further, in a cold start, as long as the oscillator has not started, voltage $V_s$ remains substantially at 0 V. As soon as oscillator 12 has started, voltage $V_s$ decreases below 0 V, so that the oscillation frequency of oscillator 12 increases faster than if oscillator 12 was connected to ground GND and the variation rate of the transformation ratio of charge pump circuit 10 is increased.

Figure 11:
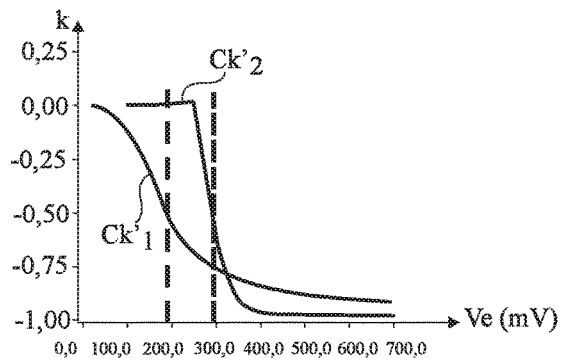
FIG. 11 shows curves of the variation of the transformation ratio of the converter according to the voltage received by the converter respectively for the converter of FIG. 10 and for a converter with enhancement transistors.

FIG. 11 shows variation curves $Ck_{1'}$ and $Ck_{2'}$, according to voltage $V_e$, of transformation ratios $k_{1'}$ and $k_{2'}$ respectively of converter 40 shown in FIG. 10 and of a converter having the same structure as converter 40 with the difference that transistors $T_{13}$ to $T_{16}$ are replaced with N-channel enhancement MOS transistors. Curves $Ck_{1'}$ and $Ck_{2'}$ have been obtained for MOS transistors having a 0.18-μm channel length.

For curves $Ck_{1'}$ and $Ck_{2'}$, transformation ratios $k_{1'}$ and $k_{2'}$, which are negative, decrease when voltage $V_e$ increases. However, the decrease is faster when depletion MOS transistors are used. Indeed, transformation ratio $k_{1'}$ decreases below −0.5 as soon as voltage $V_e$ increases above 200 mV while transformation ratio $k_{2'}$ decreases below −0.5 only when voltage $V_e$ increases above 300 mV.

Figure 12:
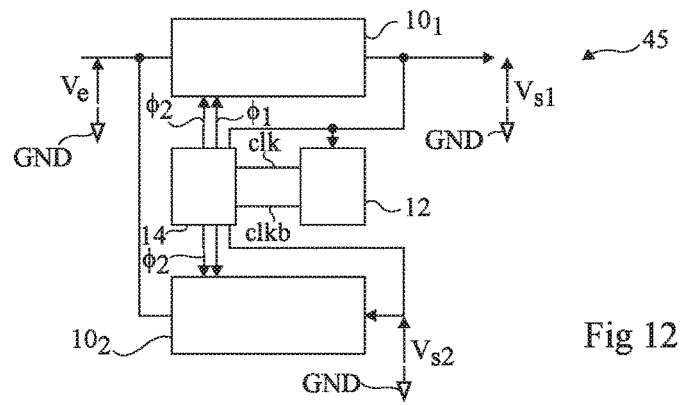
FIGS. 12 and 13 are electric diagrams of other embodiments of a cold start DC/DC converter.

FIG. 12 illustrates, in the form of a block diagram, another embodiment of a converter 45. Converter 45 comprises two charge pump circuits $10_1$ and $10_2$. Charge pump circuit $10_1$ is capable of supplying a positive voltage $V_{s1}$, of same sign as voltage $V_e$ and charge pump circuit $10_2$ is capable of supplying a voltage $V_{s2}$ of a sign opposite to that of voltage $V_e$. Oscillator 12 and interface circuit 14 are supplied with positive voltage $V_{s1}$ and negative voltage $V_{s2}$. Interface circuit 14 supplies control signals $\phi_1$ and $\phi_2$ to the two charge pump circuits $10_1$ and $10_2$. In normal operation, control signals $\phi_1$ and $\phi_2$ alternate between voltage $V_{s1}$, which may be greater than $V_e$, and voltage $V_{s2}$, which is negative. This enables to improve the conduction and the blocking of the MOS transistors of charge pump circuit $10_1$ and $10_2$. The transformation ratio of charge pump circuit $10_1$ is thus increased and becomes closer to the theoretical maximum value. Further, as soon as oscillator 12 has started, voltage $V_{s1}$ is greater than voltage $V_e$ and voltage $V_{s2}$ decreases below 0 V, so that the oscillation frequency of oscillator 12 increases faster than if oscillator 12 was connected to voltage $V_e$ and to ground GND and the variation rate of the transformation ratio of charge pump circuit 10 is increased.

Figure 13:
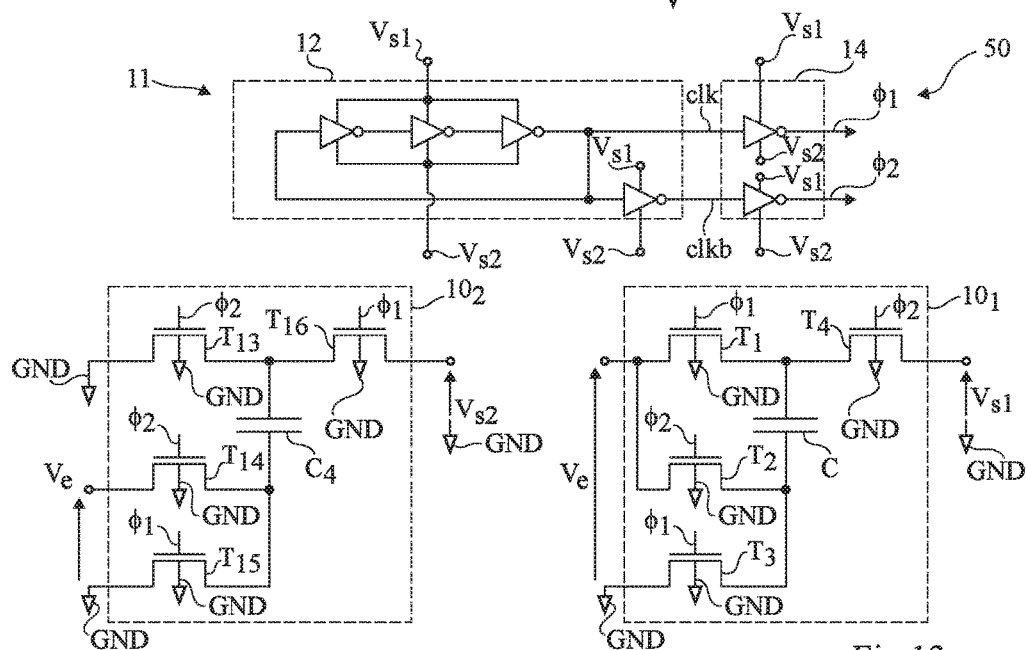

FIG. 13 shows, as an example, an embodiment of a converter 50, corresponding to a more detailed embodiment of converter 45 of FIG. 12, where charge pump circuit $10_1$ has the structure of charge pump circuit 10 of converter 5, where charge pump circuit $10_2$ has the structure of charge pump circuit 10 of converter 40, where oscillating circuit 11 has the structure of oscillating circuit 11 of converter 10 with the difference that oscillating circuit 11 is supplied with voltage $V_{s1}$ instead of voltage $V_e$ and receives voltage $V_{s2}$ instead of being connected to ground GND. Interface circuit 14 supplies control signals $\phi_1$ and $\phi_2$ to the two charge pump circuits $10_1$ and $10_2$. In normal operation, control signals $\phi_1$ and $\phi_2$ alternate between voltage $V_{s1}$, which, in the present embodiment, is substantially equal to $2V_e$, and voltage $V_{s2}$, which, in the present embodiment, is substantially equal to $-V_e$.

Figure 14:
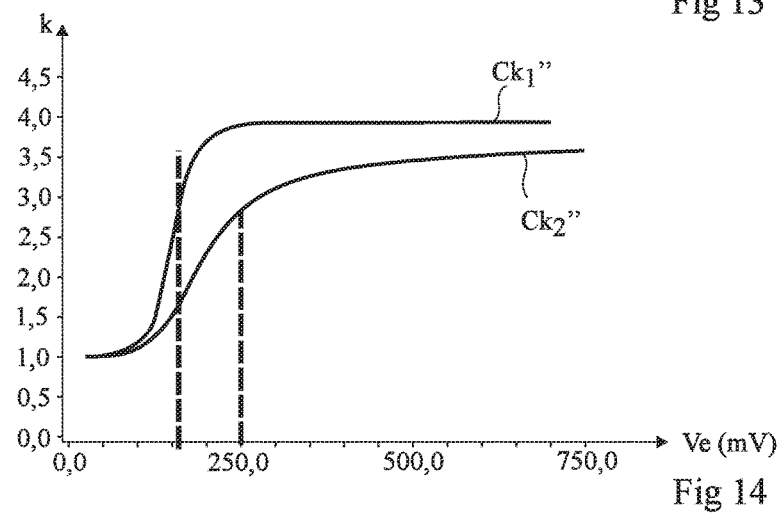
FIG. 14 shows curves of the variation of the transformation ratio of the converter according to the voltage received by the converter respectively for the converter of FIG. 13 and for a converter with enhancement transistors.

FIG. 14 is a drawing similar to FIG. 7 for converter 45 of FIG. 12 in the case where charge pump circuit $10_1$ is a voltage step-up circuit having the structure of the charge pump circuit of converter 35 shown in FIG. 9. FIG. 14 shows variation curves $Ck_{1''}$ and $Ck_{2''}$, according to voltage $V_e$, of transformation ratios $k_{1''}$ and $k_{2''}$ of charge pump circuit $10_2$ respectively of converter 45 and of a converter having the same structure as converter 45 with the difference that the transistors of charge pump circuits $10_1$ and $10_2$ are replaced with N-channel enhancement MOS transistors. Curves $Ck_{1''}$ and $Ck_{2''}$ have been obtained for MOS transistors having a 0.18-μm channel width.

For curves $Ck_{1''}$ and $Ck_{2''}$, transformation ratio $k_{1''}$ and $k_{2''}$ decreases when voltage $V_e$ decreases. However, the decrease is faster when enhancement MOS transistors are used. Indeed, transformation ratio $k_{2''}$ decreases below 2.75 as soon as voltage $V_e$ decreases below 250 mV while transformation ratio $k_{1''}$ decreases below 2.75 only when voltage $V_e$ decreases below 155 mV.

Figure 15:
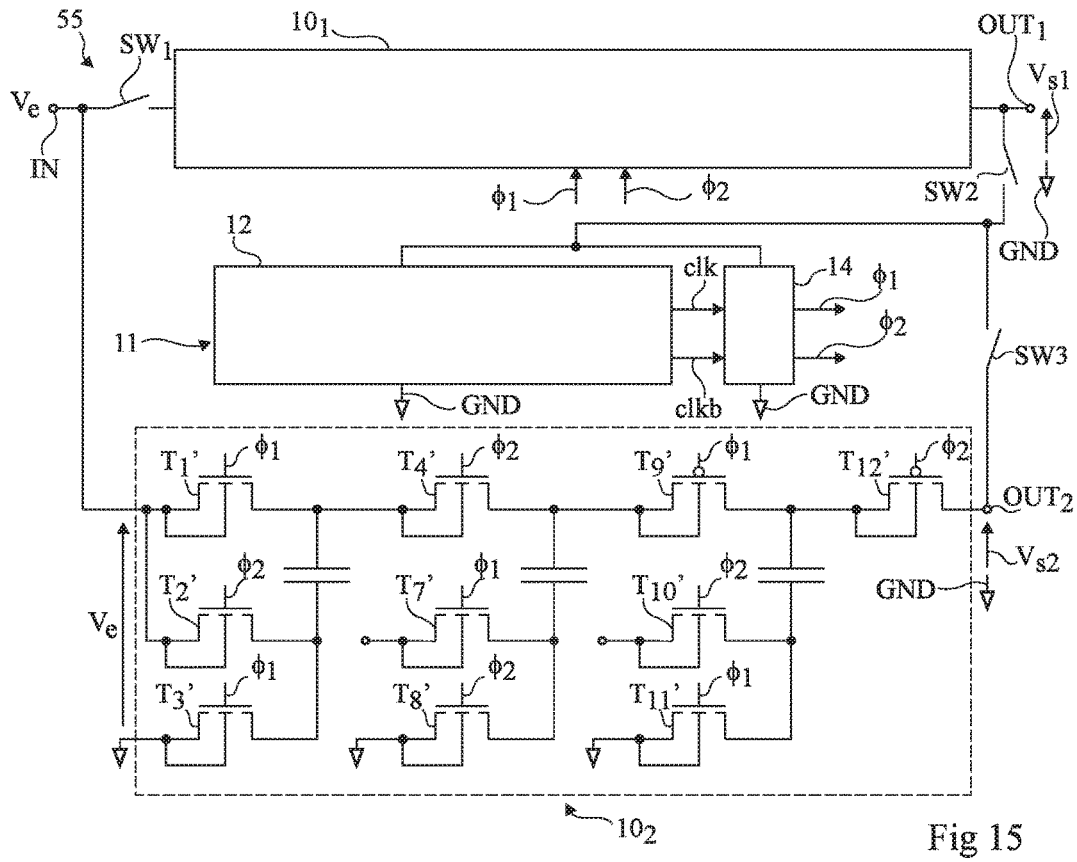
FIGS. 15 and 16 are electric diagrams of other embodiments of a cold start DC/DC converter.

FIG. 15 shows another embodiment of a converter 55. Converter 55 comprises two charge pump circuits $10_1$ and $10_2$. Charge pump circuit $10_1$ is connected to input node IN and supplies a voltage $V_{s1}$ to an output node $OUT_1$. Charge pump circuit $10_1$ may correspond to any of the charge pump circuits previously described in relation with FIG. 2, 8, 9, 10, or 13. Charge pump circuit $10_2$ is connected to input node IN and supplies a voltage $V_{s2}$ to an output node $OUT_2$. Charge pump circuit $10_2$ corresponds to an amplifier formed with enhancement MOS transistors. As an example, charge pump circuit $10_2$ may correspond to any of the charge pump circuits previously described in relation with FIG. 2, 8, 9, 10, or 13 by replacing the depletion MOS transistors with enhancement MOS transistors. In FIG. 15, the shown charge pump circuit $10_2$ has the same structure as charge pump circuit 10 shown in FIG. 9 with the difference that depletion MOS transistors $T_1$ to $T_4$ and $T_7$ to $T1_2$ have been respectively replaced with enhancement MOS transistors $T_{1'}$ to $T_{4'}$ and $T_{7'}$ to $T_{12'}$. Converter 55 comprises oscillator 12 and interface circuit 14 such as previously described. According to an embodiment, oscillator 12 and interface circuit 14 are connected to output node $OUT_1$. Charge pump circuit $10_2$ may have the same structure as charge pump circuit $10_1$ with the difference that the depletion MOS transistors of charge pump circuit $10_1$ are replaced with enhancement MOS transistors.

During a cold start at low voltage $V_e$, charge pump circuit $10_1$, which supplies voltage $V_{s1}$, starts faster and under a lower voltage $V_e$ than charge pump circuit $10_2$. Charge pump circuit $10_2$ only starts when voltage $V_{s1}$ is greater than the threshold voltage of the enhancement MOS transistors forming it. Indeed, control signals $\phi_1$ and $\phi_2$ of the gates of the enhancement MOS transistors of charge pump circuit $10_2$ vary substantially from 0 V to $V_{s1}$. When charge pump circuit $10_2$ operates normally, it may be advantageous to use voltage $V_{s2}$ supplied by charge pump circuit $10_2$ since the power efficiency, equal to the ratio of the power supplied by the charge pump circuit to the power received by the charge pump circuit, of charge pump circuit $10_2$ may be greater than the power efficiency of charge pump circuit $10_1$.

According to an embodiment, charge pump circuit $10_1$ is connected to input node IN by a switch SW1. Further, oscillator 12 and interface circuit 14 are connected to output node $OUT_1$ by a switch $SW_2$ and to output node $OUT_2$ by a switch $SW_3$. Switches $SW_1$, $SW_2$, and $SW_3$ are controlled by a control unit, not shown, which may comprise a dedicated circuit. According to an embodiment, during a cold start with a low voltage $V_e$, switches $SW_1$ and $SW_2$ are on and switch $SW_3$ is off. Oscillating circuit 11 is then powered with voltage $V_{s1}$. The control unit may be capable of comparing voltage $V_{s1}$ with a reference voltage, for example, equal to the sum of the threshold voltage of the enhancement MOS transistors of charge pump circuit $10_2$ and of a security margin. When voltage $V_{s1}$ is greater than the reference voltage, the control unit may turn off switch $SW_1$ to increase the power transfer to charge pump circuit $10_2$. Further, switch $SW_2$ may then be turned off and switch $SW_3$ may be turned on so that circuits 12 and 14 are then powered with voltage $V_{s2}$.

Figure 16:
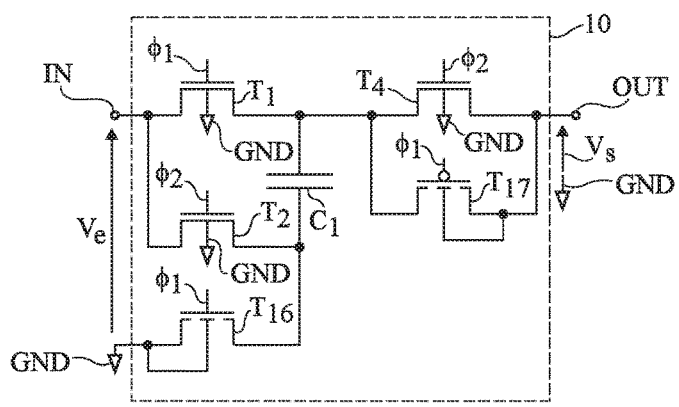

FIG. 16 shows another embodiment of a charge pump circuit 10 of voltage doubler type. Charge pump circuit 10 shown in FIG. 16 comprises all the elements of charge pump circuit 10 previously described in relation with FIG. 2 with the difference that depletion MOS transistor $T_3$ is replaced with an N-channel enhancement transistor $T_{16}$. The bulk of transistor $T_{16}$ is connected to ground GND. This enables to improve the power efficiency of the converter. Preferably, depletion MOS transistors $T_1$ and $T_2$ are not replaced with enhancement MOS transistors, to avoid degrading the starting performance of charge pump circuit 10.

An enhancement MOS transistor may be provided in parallel with a depletion MOS transistor for at least one of the depletion MOS transistors of the charge pump circuit. This enables to improve the power efficiency of the converter while keeping the advantages of the use of depletion MOS transistors. As an example, in FIG. 16, a P-channel enhancement MOS transistor $T_{17}$ may be assembled in parallel with depletion MOS transistor $T_4$, a first power terminal of transistor $T_{17}$ being connected to the first electrode of capacitor $C_1$, the second power terminal of transistor $T_{17}$ being connected to output node OUT. The gate of transistor $T_{17}$ receives control signal $\phi_1$. The bulk of transistor $T_{17}$ may be connected to output node OUT. This enables to improve the power efficiency of the converter.

Figure 17:
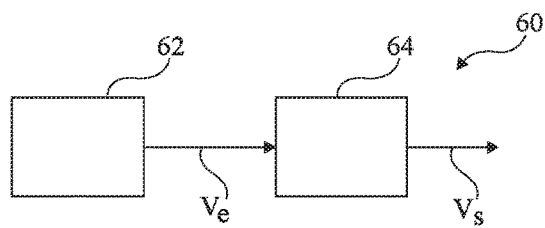
FIG. 17 shows an embodiment of a power recovery system

FIG. 17 shows an embodiment of a power recovery system 60 comprising a transducer 62 capable of supplying voltage $V_e$ to a converter 64 which may correspond to any of previously-described converters 5, 30, 35, 40, 45, 50, 55. Transducer 62 may be capable of transforming into electric power another form of power, for example, thermal power, mechanical power, or radiative power.

Specific embodiments have been described. Various alterations, modifications, and improvements will readily occur to those skilled in the art. In particular, although, in the previously-described embodiments, oscillator 12 is a ring oscillator, it should be clear that oscillator 12 may have a different structure. As an example, the previously-described embodiments may be implemented with a relaxation oscillator.

Further, it should be noted that those skilled in the art may combine various elements of these various embodiments and variations without showing any inventive step. As an example, the embodiments previously described in relation with FIGS. 13 and 15 may be combined, and the converter may comprise two charge pump circuits used to supply the two voltages between which the oscillating circuit is supplied at the starting as shown in FIG. 13 and one charge pump circuit with enhancement MOS transistors, such as shown in FIG. 15, used to supply the output voltage of the converter once the converter has started.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:
1. A DC/DC converter comprising:
a first charge pump circuit comprising:
first MOS transistors including first depletion MOS transistors,
a first terminal intended to receive a first voltage,
a second terminal intended to supply a second voltage,
a least one capacitor,
at least one conduction path between the first terminal and the second terminal only comprising some of said first depletion MOS transistors in series, and
at least one conduction path between the first terminal and an electrode of the capacitor comprising only one of the first depletion MOS transistors or only some of said first depletion MOS transistors in series,
a second charge pump circuit comprising:
second MOS transistors including second depletion MOS transistors, and
a third terminal intended to receive the first voltage and a fourth terminal intended to supply a third voltage of a sign opposite to that of the first voltage, and
wherein the oscillating circuit is powered between the second voltage and the third voltage, and
an oscillating circuit connected to:

the charge pump circuit only at the gates of at least some of the first MOS transistors including the first depletion MOS transistors,
the second charge pump circuit only at the gates of at least some of the second MOS transistors including the second depletion MOS transistors, wherein the oscillating circuit is supplied with the second voltage.

2. The converter of claim 1, wherein the oscillating circuit comprises a ring oscillator.

3. The converter of claim 1, wherein the oscillating circuit is powered with the first voltage.

4. The converter of claim 3, comprising a third charge pump circuit only comprising third enhancement MOS transistors, the oscillating circuit being further connected to the third charge pump circuit only at the gates of some at least of the third enhancement MOS transistors, the third charge pump circuit comprising a fifth terminal intended to receive the first voltage and a sixth terminal intended to supply a fourth voltage of same sign as the first voltage.

5. The converter of claim 4, further comprising a switching circuit capable of successively powering the oscillating circuit with the second voltage and with the fourth voltage.

6. An electronic power recovery system comprising a transducer capable of supplying a voltage from a power source and the converter of claim 1, the charge pump circuit receiving said voltage.

7. A DC/DC converter comprising:
a first charge pump circuit comprising:
first MOS transistors including first depletion MOS transistors,
a first terminal intended to receive a first voltage,
at least one capacitor, and
at least one conduction path between the first terminal and an electrode of the capacitor comprising only one of the first depletion MOS transistors or only some of said first depletion MOS transistors in series,
a third charge pump circuit only comprising third enhancement MOS transistors,
an oscillating circuit connected to:
the first charge pump circuit only at the gates of at least some of the first MOS transistors including the first depletion MOS transistors,
the third charge pump circuit only at the gates of some at least of the third enhancement MOS transistors, wherein:
the oscillating circuit is powered with the first voltage, and
the third charge pump circuit comprising a fifth terminal intended to receive the first voltage and a sixth terminal intended to supply a fourth voltage of same sign as the first voltage, and
a switching circuit capable of successively powering the oscillating circuit with a second voltage and with the fourth voltage.

8. The converter of claim 7, wherein the oscillating circuit comprises a ring oscillator.

9. The converter of claim 7, wherein the first charge pump circuit is intended to supply the second voltage and wherein the oscillating circuit is supplied with the second voltage.

10. The converter of claim 9, wherein the first charge pump circuit further comprises a second terminal intended to supply the second voltage and wherein the first charge pump circuit comprises at least one conduction path between the first terminal and the second terminal only comprising some of said first depletion MOS transistors in series.

11. The converter of claim 10, comprising a second charge pump circuit comprising second MOS transistors including second depletion MOS transistors, the oscillating circuit being connected to the second charge pump circuit only at the gates of at least some of the second MOS transistors including the second depletion MOS transistors, the second charge pump circuit comprising a third terminal intended to receive the first voltage and a fourth terminal intended to supply a third voltage of a sign opposite to that of the first voltage, and wherein the oscillating circuit is powered between the second voltage and the third voltage.

12. An electronic power recovery system comprising a transducer capable of supplying a voltage from a power source and the converter of claim 7, the charge pump circuit receiving said voltage.

* * * * *